(12) United States Patent
Wright

(10) Patent No.: US 8,056,363 B1
(45) Date of Patent: Nov. 15, 2011

(54) METHOD FOR PRODUCING A HIGHLY REFRACTIVE COMPOSITE GEMSTONE, AND PRODUCT

(75) Inventor: Less Wright, Sammamish, WA (US)

(73) Assignee: Betterthandiamond, Inc., Sammamish, WA (US)

( * ) Notice: Subject to any disclaimer, the term of this patent is extended or adjusted under 35 U.S.C. 154(b) by 821 days.

(21) Appl. No.: 12/139,931

(22) Filed: Jun. 16, 2008

(51) Int. Cl.
A44C 17/00 (2006.01)

(52) U.S. Cl. ............ 63/32; 63/34; 427/162; 427/902; 428/15

(58) Field of Classification Search .......... None
See application file for complete search history.

(56) References Cited

U.S. PATENT DOCUMENTS

| | | | |
|---|---|---|---|
| 2,466,119 A * | 4/1949 | Moulton et al. ............ 359/580 |
| 2,859,138 A * | 11/1958 | Blanchard ............... 427/376.2 |
| 3,039,280 A * | 6/1962 | Flad et al. ..................... 63/32 |
| 3,490,250 A * | 1/1970 | Jones .............................. 63/32 |
| 5,190,807 A | 3/1993 | Kimock et al. |
| 5,366,556 A | 11/1994 | Prince et al. |
| 5,401,544 A | 3/1995 | Nakahata et al. |
| 5,559,061 A * | 9/1996 | Bilek et al. .................... 501/69 |
| 5,635,245 A | 6/1997 | Kimock et al. |
| 5,637,353 A * | 6/1997 | Kimock et al. .......... 427/255.34 |
| 5,795,648 A | 8/1998 | Goel et al. |
| 5,858,077 A | 1/1999 | Kayanoki |
| 5,879,775 A | 3/1999 | Walter et al. |
| 6,171,646 B1 | 1/2001 | Gerhardinger |
| 6,197,428 B1 * | 3/2001 | Rogers ........................ 428/446 |
| 6,277,480 B1 | 8/2001 | Veerasamy et al. |
| 6,312,808 B1 | 11/2001 | Veerasamy et al. |
| 6,335,086 B1 | 1/2002 | Veerasamy |
| 6,338,901 B1 | 1/2002 | Veerasamy |
| 6,726,814 B2 | 4/2004 | Ohmi et al. |
| 6,997,014 B2 * | 2/2006 | Starcke et al. .................... 63/32 |
| 7,137,275 B2 * | 11/2006 | Starcke et al. .................... 63/32 |
| 7,526,928 B1 * | 5/2009 | Kearnes et al. ................... 63/32 |
| 2003/0224167 A1 | 12/2003 | Wright |
| 2004/0083759 A1 * | 5/2004 | Starcke et al. .................... 63/32 |
| 2006/0065016 A1 * | 3/2006 | Starcke et al. .................... 63/32 |
| 2006/0182883 A1 | 8/2006 | Neogi et al. |
| 2007/0157666 A1 * | 7/2007 | Starcke et al. .................... 63/32 |
| 2010/0068503 A1 | 3/2010 | Neogi et al. |

* cited by examiner

Primary Examiner — Jack W. Lavinder
(74) Attorney, Agent, or Firm — Charles I. Sherman; Middleton Reutlinger (57) ABSTRACT

A method for providing a protective coating and enhanced optical qualities to a gemstone. The method includes coating a first portion and a second portion of a gemstone with $TiO_2$ doped with calcium oxide ($TiO_2+$). The $TiO_2+$ coated gemstone is next coated with a diamond like carbon (DLC) coating. The gemstone may be synthetic or natural. The composite gemstone, having been coated with both $TiO_2$ and DLC, exhibits high refractivity and enhanced wear resistance and color.

36 Claims, 7 Drawing Sheets

METHOD FOR PRODUCING A HIGHLY REFRACTIVE COMPOSITE GEMSTONE, AND PRODUCT

BACKGROUND OF THE INVENTION

1. Field of the Invention

The present invention relates generally to gemstones and more specifically it relates to a method for producing a highly refractive composite gemstone having a protective coating and other enhanced optical qualities.

2. Description of Related Art

Gemstones may be found in nature or they may be man-made, and they include but are not limited to naturally occurring rubies, sapphires, emeralds, and diamonds as well as man-made cubic zirconium and moissanite stones. Gemstones are typically cut to a desired shape and are often placed within a metal setting for use as a ring or other common pieces of jewelry.

One problem with gemstones is that they often do not have the desired optical beauty or the desired color grade. Another problem is that they can become scratched or worn over time thereby reducing their attractiveness.

In these respects, the highly refractive composite gemstones made according to the embodiments of the present invention substantially depart from conventional concepts and designs of the prior art, and in so doing provide gemstones having substantially enhanced optical qualities and a protective coating to reduce scratching or wear on their surfaces.

BRIEF SUMMARY OF THE INVENTION

The embodiments of the present invention provide a new highly refractive composite gemstone having a protective coating and enhanced optical qualities, and a method for producing such a composite gemstone.

The present invention generally comprises first coating the entire surface of the gemstone with a highly refractive layer of $TiO_2$ containing or doped with calcium oxide in the ratio of about 3.5 to about 4.5 $TiO_2$:about 1 calcium oxide as measured by x-ray photoelectron spectroscopy (XPS) analysis, hereinafter referred to as "$TiO_2$+", to substantially improve the glossiness or luster of the stone. Most preferably the ratio is about 3.75 $TiO_2$:about 1 calcium oxide. $TiO_2$+ has been found to be particularly effective for this purpose as it has a greater refractive index than even diamond.

The $TiO_2$+ layer is then sealed in by coating the entire surface of the $TiO_2$+ coated gemstone with an additional layer of diamond-like carbon ("DLC"). The DLC coating enhances the wear resistance and color of the resultant composite gemstone.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

To the accomplishment of the above and related objects, this invention may be embodied in the form illustrated in the accompanying drawings, attention being called to the fact, however, that the drawings are illustrative only, and that changes may be made in the specific method and construction illustrated and described within the scope of the appended claims.

BRIEF DESCRIPTION OF THE DRAWINGS

Various other objects, features, and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
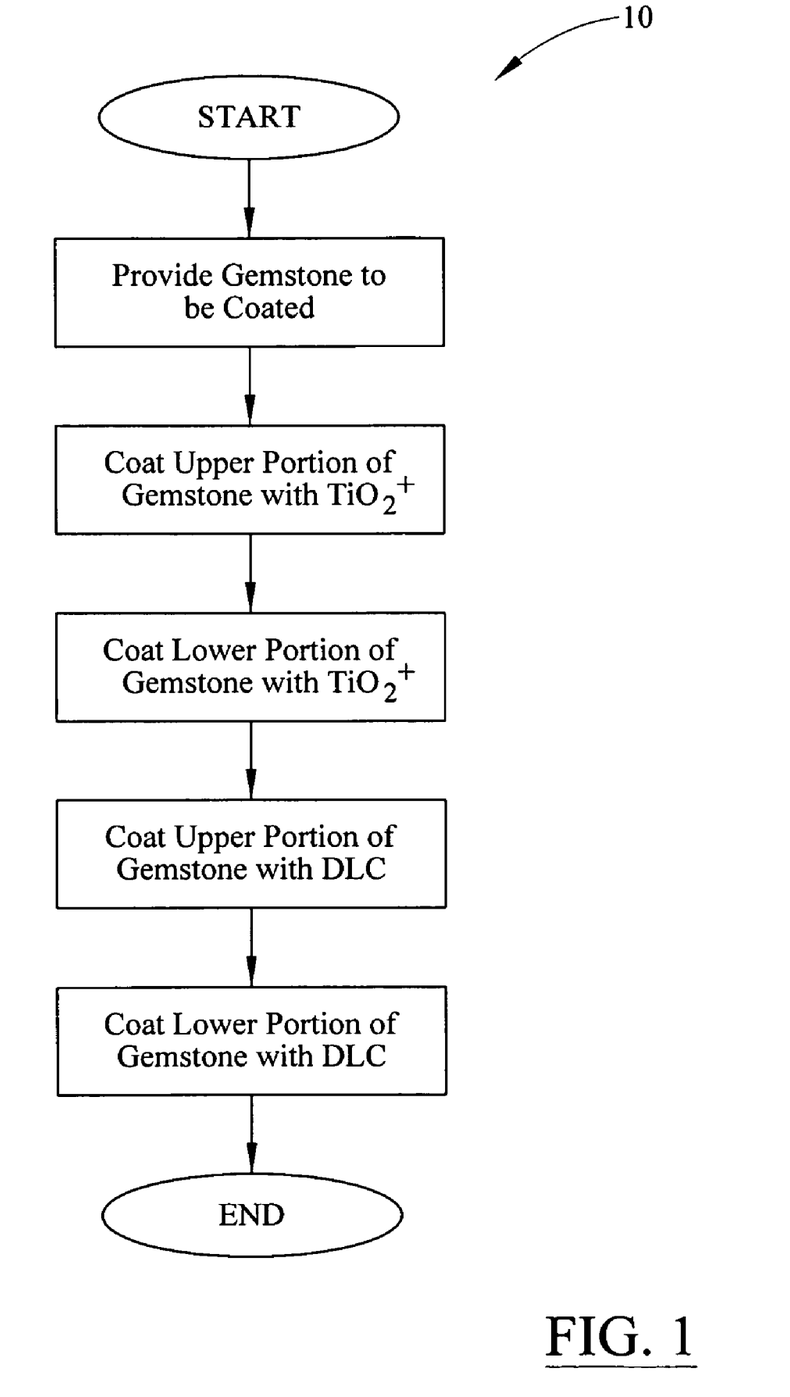
FIG. 1 is a flowchart of a preferred embodiment of the inventive method.
Figure 2:
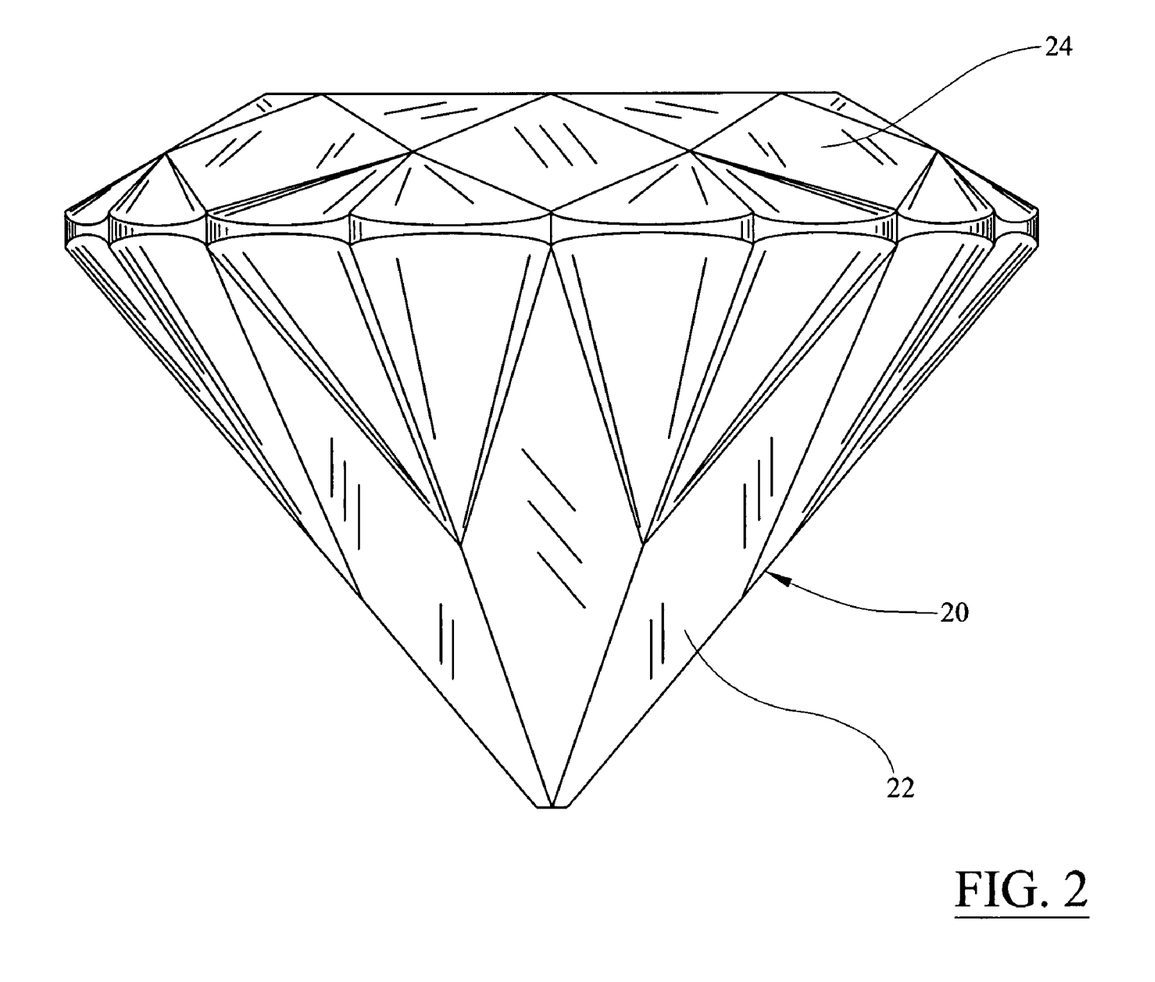
FIG. 2 is a side view of a non-coated gemstone.
Figure 3:
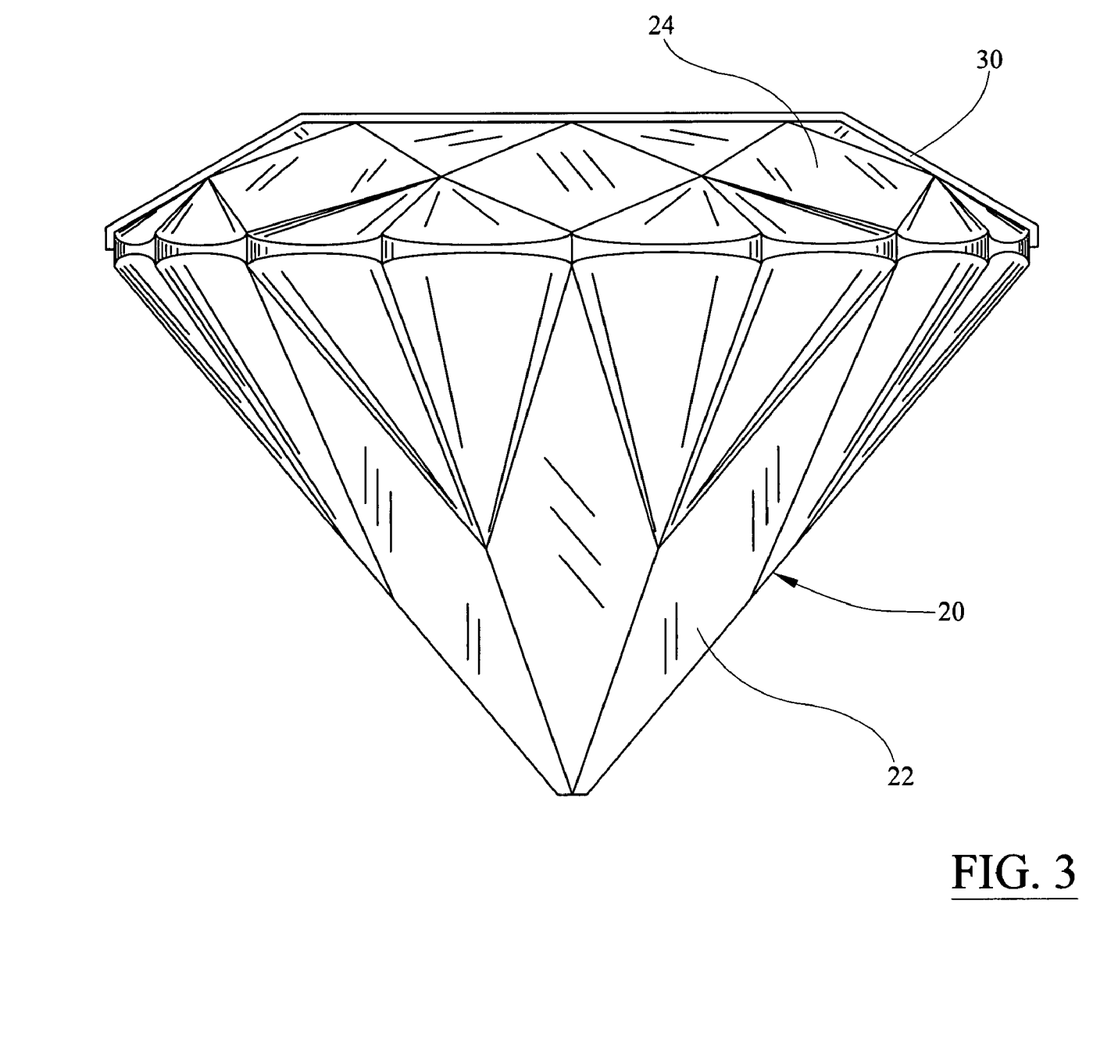
FIG. 3 is a side view of the gemstone with a first portion coated with $TiO_2$+.
Figure 4:
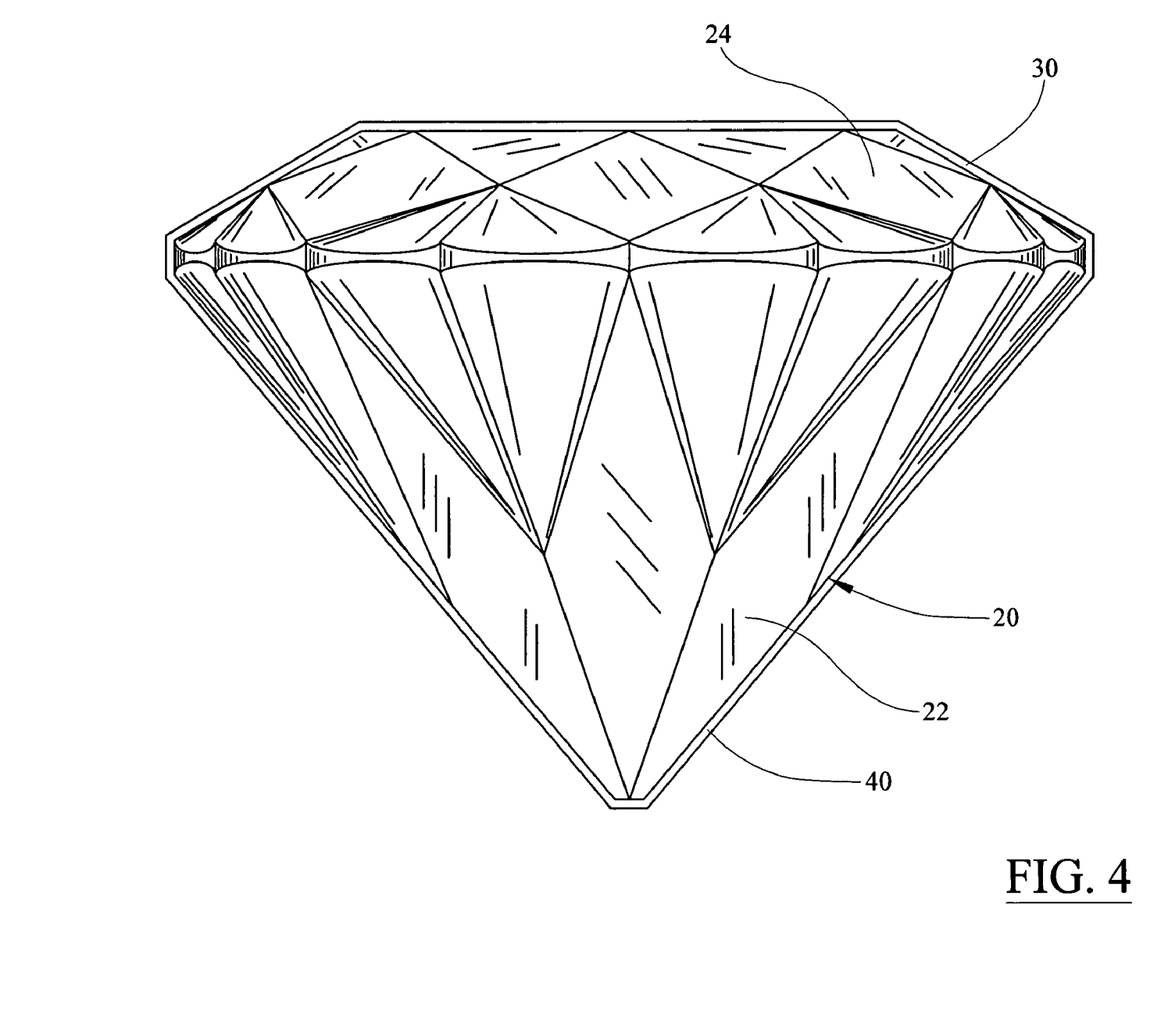
FIG. 4 is a side view of a gemstone with a first portion and second portion coated with $TiO_2$+.

Turning now descriptively to the drawings, in which similar reference characters denote similar elements throughout the several views, FIG. 1 illustrates a method for producing a composite gemstone 10, which in the first instance comprises coating a first portion 24 and a second portion 22 of a gemstone 20 with a layer of $TiO_2$+ as shown in FIGS. 2, 3, and 4. The gemstone 20 may be synthetic or natural. The $TiO_2$+ coating is highly refractive and greatly enhances the optical characteristics, particularly glossiness or luster of the underlying gemstone 20.

FIG. 1 shows schematically the desired process for coating a gemstone 20 with $TiO_2$+. $TiO_2$+ provides a highly refractive coating which is in fact more refractive than diamond. Physical Vapor Deposition is an acceptable coating process for $TiO_2$+, and encompasses sputtering, cathodic arc, and other coating procedures known to those skilled in the art that may be utilized with the present invention to achieve similar results.

FIG. 2 illustrates an exemplary gemstone 20 having a solid exterior surface. It can be appreciated that the gemstone 20 may be pre-cut to have various sizes, shapes, and structure which are commonly utilized within the jewelry industry, other than the specific example illustrated in the attached drawings. The gemstone 20 may be any one of various gemstones including synthetic or natural, such as but not limited to naturally occurring diamonds, rubies, sapphires, emeralds, and man-made stones such as cubic zirconium and moissanite.

Utilizing a conventional Physical Vapor Deposition application process such as sputtering or cathodic arc, the first portion 24 of the gemstone 20 is preferably coated with a first layer 30 of $TiO_2$+ as shown in FIG. 3 of the drawings. The first portion 24 may represent the broad upper portion of the gemstone 20 (if applicable) or the lower tapering portion of the gemstone 20 (if applicable). The first layer 30 comprising $TiO_2+$ may vary in thickness as desired depending upon the gemstone and the application for which the gemstone is to be utilized, but a preferred range of thickness of about 100 to 300 nanometers, and a most preferred thickness of about 150 nanometers has been found useful for jewelry applications.

Figure 7:
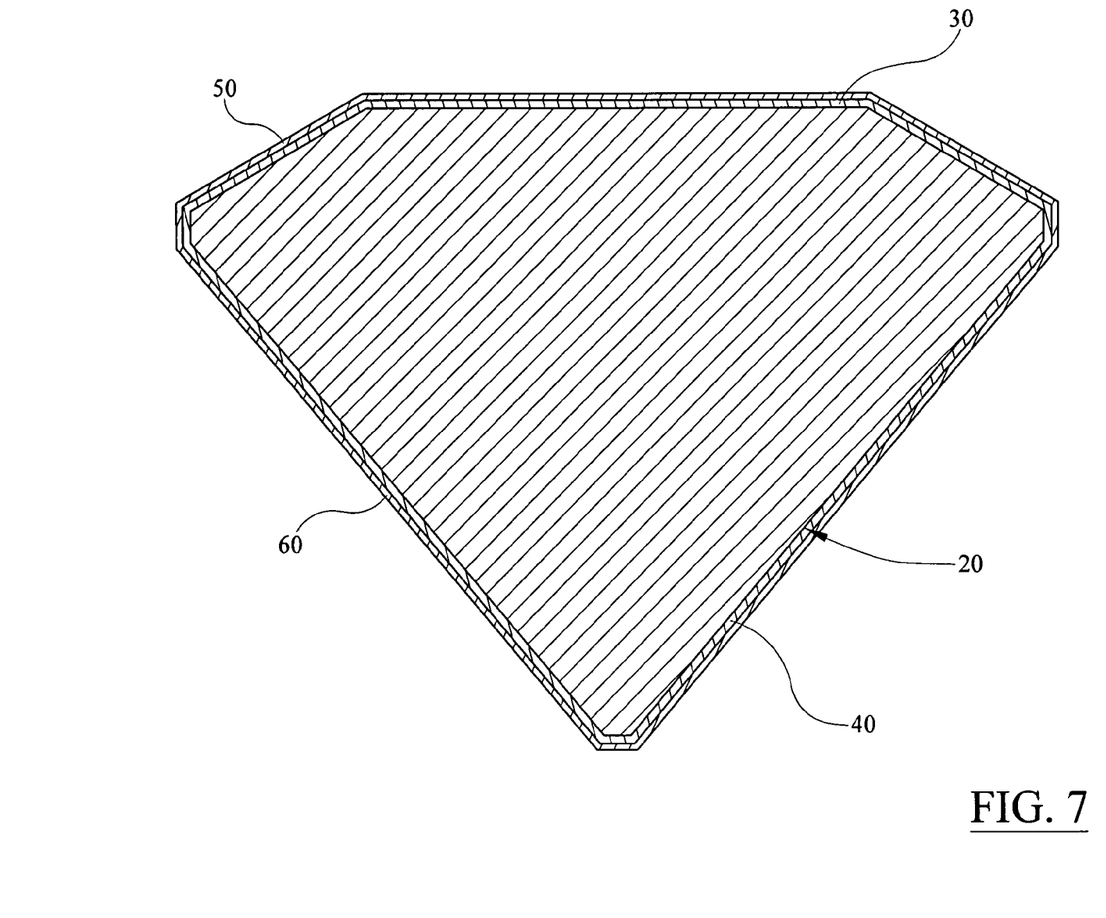
FIG. 7 is a side sectional view of the composite gemstone of FIG. 6.

After the first layer 30 has been applied to the gemstone, the second portion 22 of the gemstone 20 is then coated with a second layer 40 of $TiO_2+$ thereby providing the $TiO_2+$ coating about the entire exterior surface of the gemstone 20 as shown in FIGS. 4 and 7 of the drawings.

The thickness of the second layer 40 may vary as desired depending upon the gemstone 20 and the application for which the gemstone is to be utilized. The second layer 40 of $TiO_2+$ may be thinner or thicker than first layer 30 of $TiO_2+$, but again a thickness of about 200 to about 300 nanometers, and a most preferred thickness of about 150 nanometers has been found useful for jewelry application. In addition, the second layer 40 and the first layer 30 may each have varying thickness throughout as desired. The inventor has found however that a uniform thickness of $TiO_2+$ throughout is optimal for each layer 30, 40 for jewelry applications.

Alternatively, the first layer 30 and the second layer 40 may be applied simultaneously upon the gemstone 20. In another alternative embodiment, only a portion of the gemstone 20 may be covered with the $TiO_2+$ coating.

The $TiO_2+$ coating upon the gemstone 20 preferably covers the entire exterior surface of the gemstone 20 for providing enhanced optical characteristics, particularly, high light refraction. $TiO_2+$ coatings have a high refractive index which increases the overall refraction of the gemstone 20.

Figure 5:
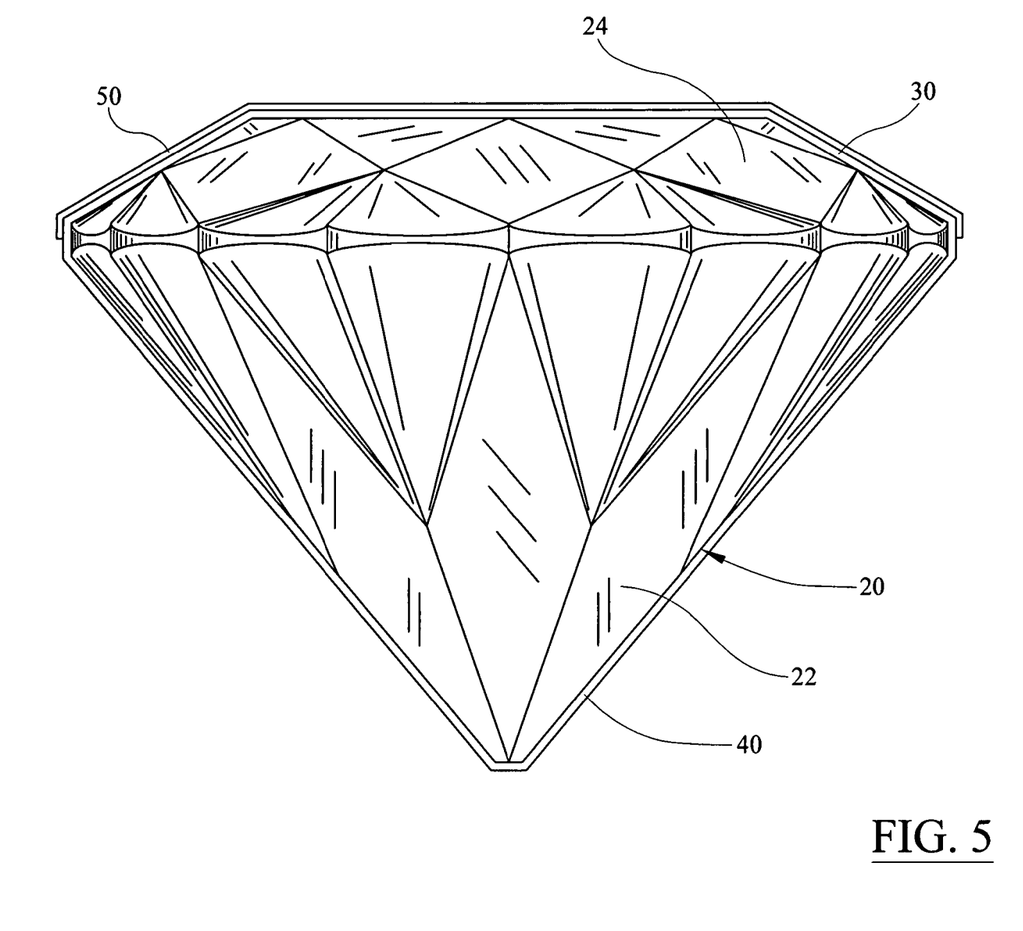
FIG. 5 is a side view of the gemstone of FIG. 4 with the first portion additionally coated with DLC.

Turning now to FIGS. 4 and 5, there is illustrated the next part of the method of the embodiments of the invention which comprises coating the first portion 24 and the second portion 22 of the gemstone 20 with a diamond-like carbon (DLC) coating applied over the previously applied $TiO_2+$ highly refractive coating. A preferred form of DLC for the purpose is tetrahedral amorphous carbon (TaC). The DLC coating enhances the wear resistance and color characteristics of the underlying gemstone 20. Additionally, when used to coat cubic zirconium, DLC prevents the cloudiness that often develops in cubic zirconium over time as a result of absorption of water and $CO_2$.

FIG. 1 also shows schematically the desired process for coating a gemstone 20 with DLC after it has been coated with $TiO_2$, to provide the resultant composite gemstone embodiments of the invention. DLC provides a hard, transparent and wear resistant coating. U.S. Pat. No. 5,879,775 discloses an acceptable Physical Vapor Deposition coating process and structure utilizing DLC and is hereby incorporated by reference for describing how to utilize DLC. There will be apparent to those skilled in the art various other DLC coating procedures and compositions that may be utilized with the present invention to achieve similar results.

Utilizing a conventional DLC application process, the first $TiO_2+$ coated portion 24 of gemstone 20 is now preferably coated with a first layer 50 of DLC as shown in FIG. 5 of the drawings. The first portion 24 may represent the broad upper portion of the gemstone 20 (if applicable) or the lower tapering portion of the gemstone 20 (if applicable). The first layer 50 comprising DLC may vary in thickness as desired depending upon the gemstone 20 and the application for which the gemstone is to be utilized, but a preferred range of thickness of about 100 to 300 nanometers, and a most preferred thickness of about 150 nanometers has been found useful for jewelry applications.

Figure 6:
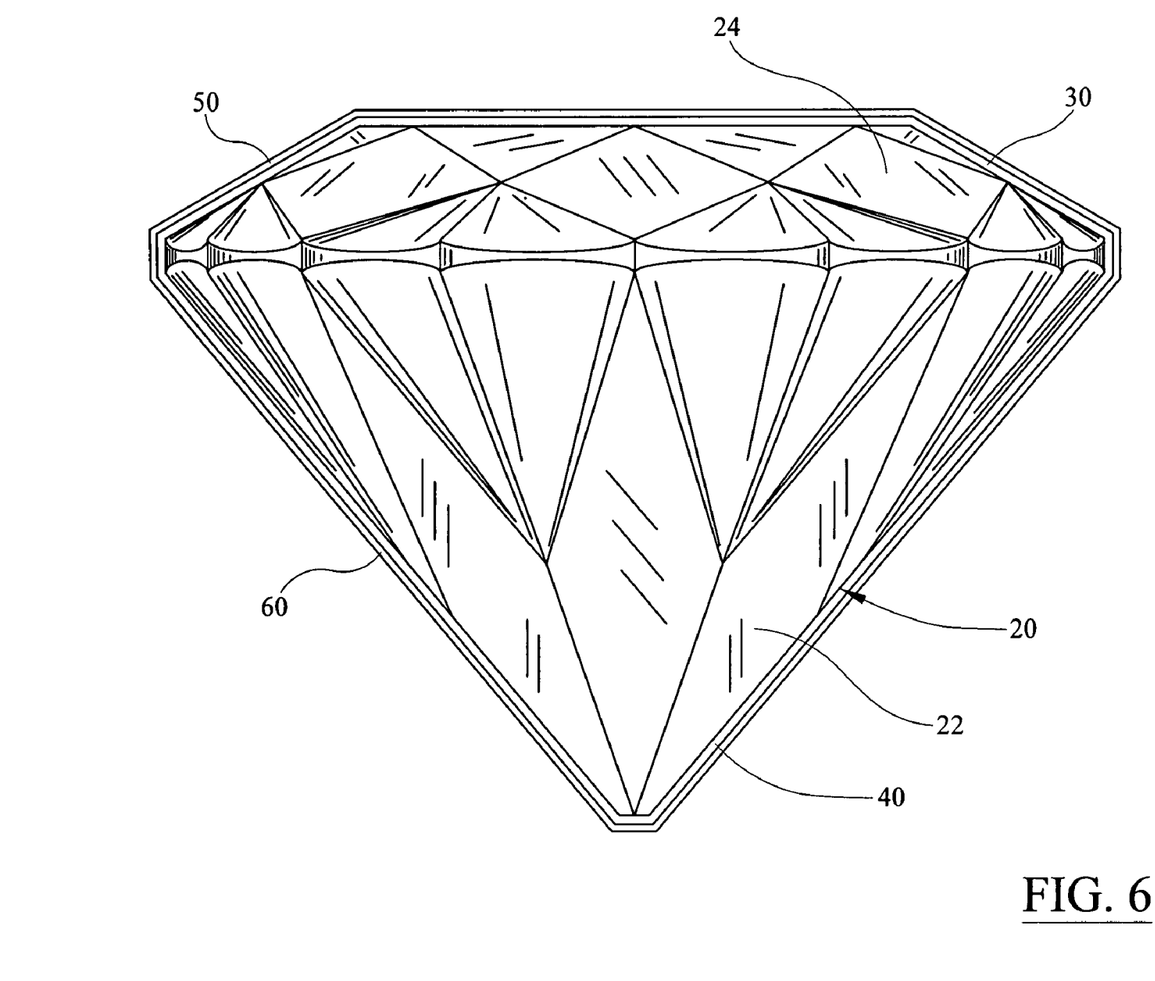
FIG. 6 is a side view of the gemstone of FIG. 4 with the first portion and second portion additionally coated with DLC to form a composite gemstone.

After the first layer 50 has been applied to the gemstone 20 and hardened, the second $TiO_2+$ coated portion 22 of the gemstone 20 is then coated with a second layer 60 of DLC thereby providing the DLC coating about the entire $TiO_2+$ coated exterior surface of the gemstone 20 as shown in FIGS. 6 and 7 of the drawings.

The thickness of the second layer 60 may vary as desired depending upon the gemstone 20 and the application for which the gemstone is to be utilized. The second layer 60 of DLC may be thinner or thicker than first layer 50 of DLC, but again a thickness of about 100 to about 300 nanometers, and most preferred thickness of about 150 nanometers has been found useful for jewelry applications. In addition, the second layer 60 and the first layer 50 may each have varying thickness throughout as desired. The inventor has found that a uniform thickness throughout is optimal for each layer 50, 60 for jewelry applications.

Alternatively, the first layer 50 and the second layer 60 may be applied simultaneously upon the $TiO_2+$ coated gemstone 20. In another alternative embodiment, only a portion of the gemstone may be covered with the DLC coating.

The DLC coating upon the gemstone 20 preferably covers the entire $TiO_2+$ coated exterior surface of the gemstone 20 for providing enhanced optical characteristics such as but not limited to improved color grade. The inventor has discovered during testing that by coating the $TiO_2+$ coated gemstone 20 with a DLC coating, that the gemstone 20 is diluted by the DLC optics thereby improving the overall apparent color grade of the gemstone 20. In addition, the DLC coating about the $TiO_2+$ coated gemstone 20 provides increased wear resistance to scratching and other damaging events. The inventor has found that by coating the $TiO_2+$ coated gemstone 20 with the DLC coating that the hardness of the gemstone 20 is increased by at least 0.50 Mohs. The inventor has also found that the best results occur when the gemstone 20 is comprised of a transparent media such as, but not limited to, diamond.

With respect to the above description then, it is to be realized that all equivalent method steps and structural variations and relationships to those illustrated in the drawings and described in the specification are intended to be encompassed by the present invention.

Further, since numerous modifications and changes will readily occur to those skilled in the art, it is not desired to limit the embodiments invention to the exact construction and operation shown and described, and accordingly, all suitable modifications and equivalents may be resorted to, falling within the scope of the invention.

I claim:

1. A composite gemstone, comprising:
a gemstone having an exterior surface;
a coating of $TiO_2+$ substantially covering at least a portion of said exterior surface; and
a coating of DLC substantially covering at least a portion of said coating of $TiO_2+$.

2. The composite gemstone of claim 1 wherein said coating of $TiO_2+$ covers the entire exterior surface of said gemstone.

3. The composite gemstone of claim 2 wherein said coating of DLC covers the entire coating of $TiO_2+$.

4. The composite gemstone of claim 1 wherein both said coatings of $TiO_2+$ and DLC have a uniform thickness.

5. The composite gemstone of claim 4 wherein said uniform thickness of each of said $TiO_2+$ coating and said DLC coating are in the range of about 100 to about 300 nanometers.

6. The composite gemstone of claim 4 wherein the thickness of each of said $TiO_2+$ coating and said DLC coating are about 150 nanometers.

7. The composite gemstone of claim 1 wherein the thickness of each of said $TiO_2+$ coating and said DLC coating are in the range of about 100 to about 300 nanometers.

8. The composite gemstone of claim 1 wherein said $TiO_2+$ coating is non-uniform in thickness about said gemstone.

9. The composite gemstone of claim 1 wherein said DLC coating is non-uniform in thickness about said $TiO_2+$ coating.

10. The composite gemstone of claim 1 wherein said gemstone is a natural gemstone.

11. The composite gemstone of claim 1 wherein said gemstone is a synthetic gemstone.

12. The composite gemstone of claim 1 wherein said gemstone is selected from the group consisting of diamonds, rubies, sapphires, emeralds, cubic zirconium and moissanite.

13. The composite gemstone of claim 1 wherein said gemstone has a first portion and a second portion, wherein said $TiO_2+$ coating has a first layer on said first portion, and a second layer on said second portion, and wherein said DLC coating has a first layer on one said layer of said $TiO_2+$, and a second layer on the other said layer of said $TiO_2+$.

14. The composite gemstone of claim 1 wherein said DLC is tetrahedral amorphous carbon.

15. The composite gemstone of claim 1 wherein the $TiO_2+$ consists essentially of $TiO_2$ and calcium oxide in the ratio of about 3.75 $TiO_2$:about 1 calcium oxide as measured by XPS analysis.

16. A composite gemstone, comprising:
   a gemstone having an exterior surface;
   a coating of $TiO_2+$ covering substantially the entire exterior surface of said gemstone and having a uniform thickness in the range of about 100 to about 300 nanometers; and a coating of DLC covering substantially the entire coating of said $TiO_2+$ and having a uniform thickness in the range of about 100 to about 300 nanometers.

17. The composite gemstone of claim 16 wherein the thickness of each of said coating of $TiO_2+$ and said coating of DLC are about 150 nanometers.

18. The composite gemstone of claim 16 wherein said gemstone is selected from the group consisting of diamonds, rubies, sapphires, emeralds, cubic zirconium and moissanite.

19. The composite gemstone of claim 16 wherein said DLC is tetrahedral amorphous carbon.

20. The composite gemstone of claim 16 wherein the $TiO_2+$ consists essentially of $TiO_2$ and calcium oxide in the ratio of about 3.75 $TiO_2$:about 1 calcium oxide as measured by XPS analysis.

21. A method of manufacturing a composite gemstone comprising the steps of:
   providing a gemstone having an exterior surface;
   substantially coating at least a portion of said exterior surface with $TiO_2+$; and
   substantially covering at least a portion of said coating of $TiO_2+$ with a coating of DLC.

22. The method of claim 21 wherein said coating of $TiO_2+$ is applied to the entire exterior surface of said gemstone.

23. The method of claim 21 wherein said coating of DLC is applied over the entire coating of $TiO_2+$.

24. The method of claim 21 wherein said coating of $TiO_2$ and said coating of DLC are applied by a process of Physical Vapor Deposition.

25. The method of claim 24 wherein said Physical Vapor Deposition process is selected from the group consisting of sputtering or cathodic arc.

26. The method of claim 21 wherein said exterior surface of said gemstone has a first portion and a second portion, said $TiO_2+$ being applied in a first coating to said first portion and in a second coating to said second portion.

27. The method of claim 26 wherein said second coating of $TiO_2+$ is applied to said second portion after said first coating of $TiO_2+$ is applied to said first portion.

28. The method of claim 26 wherein said coating of DLC is applied in a first coating and a second coating each covering a different one of said first and second coatings of $TiO_2+$.

29. The method of claim 21 wherein said coating of $TiO_2$ is applied in a thickness of about 100 to about 300 nanometers.

30. The method of claim 29 wherein said coating of $TiO_2+$ is applied in a thickness of about 150 nanometers.

31. The method of claim 21 wherein said coating of DLC is applied in a thickness of about 100 to about 300 nanometers.

32. The method of claim 31 wherein said coating of DLC is applied in a thickness of about 150 nanometers.

33. The method of claim 21 wherein said gemstone is a natural gemstone.

34. The method of claim 21 wherein said gemstone is a synthetic gemstone.

35. The method of claim 21 wherein said DLC is tetrahedral amorphous carbon.

36. The method of claim 21 wherein the $TiO_2+$ consists essentially of $TiO_2$ and calcium oxide in the ratio of about 3.75 $TiO_2$:about 1 calcium oxide as measured by XPS analysis.

\* \* \* \* \*